United States Patent Office 3,324,044
Patented June 6, 1967

3,324,044
CATALYST TREATMENT
Alfred W. Oberhofer, Alsip, Ill., assignor to Nalco Chemical Company, Chicago, Ill., a corporation of Delaware
No Drawing. Filed Nov. 25, 1964, Ser. No. 413,963
3 Claims. (Cl. 252—413)

This invention relates to a method of treating silica-alumina catalysts which have been contaminated with certain metals, whereby their activity in respect to the conversion of hydrocarbons has been diminished. Specifically, the invention relates to a simple process for treating metal-contaminated silica-alumina cracking catalysts, whereby their activity is restored, with the treating process being basically a one-step process utilizing simple, inexpensive treating materials.

It is well-known that silica-alumina cracking catalysts tend to become contaminated with certain metals such as, for instance, iron, nickel, vanadium, and other metals of the transition series, whereby their activity is greatly impaired. When a catalyst is almost completely contaminated with such metals, it is customary to remove a portion of the catalyst from a catalytic treating unit and replace it with fresh catalyst, whereby the deleterious effect of the metals is somewhat diminished. The contaminated catalyst is then reconditioned in some manner. Numerous processes have been suggested for the removal of metal from these metal-fouled catalysts, but by and large, these processes are cumbersome, expensive, and require large installations for their successful operations. If it were possible to provide a treatment method whereby metal contaminants could be removed simply from fouled silica-alumina catalysts, a beneficial advance in the art of catalyst utilization in the refining of petroleum hydrocarbons would be afforded. It would also be of benefit if it were possible to provide a treating system which was capable of treating a wide variety of known silica-alumina catalysts.

There are numerous types of silica-alumina cracking catalysts, but they may be generically defined in regard to the amount of alumina, expressed as $Al_2O_3$, contained in the make-up of these materials. For instance, some catalysts of the synthetic type contain from 7–30% by weight of alumina, with the remainder being silica. Other catalysts, particularly the natural catalysts, such as clay, contain as much as 30–35% by weight of alumina. In some cases, clays are modified with alumina to provide combination natural-synthetic catalysts which sometimes contain from 15–50% by weight of alumina in the finished catalyst.

It would be a benefit if it were possible to treat all metal contaminated catalysts of the above type to sufficiently remove such metals whereby the original catalytic activity of these materials is substantially restored.

It is therefore an object of the invention to provide a simple treatment for the removal of metal-contaminants from silica-alumina catalytic materials.

A further object is to provide a simple, one-step treatment of the removal of metal contaminants from a wide variety of silica-alumina catalysts, with such catalysts being either natural, synthetic, or natural-synthetic catalytic materials. Other objects will appear hereinafter.

In accordance with the invention, it has been found that metal-contaminated silica-alumina catalysts may be treated whereby the metals are removed therefrom by treating said catalysts with dilute aqueous solutions, which contain not more than 5% by weight of a water-soluble acidic salt, and have a pH of from 2.0 to 5.5. Specifically, the invention is directed to the use of dilute aqueous treating solutions of acidic aluminum salts which contain from 0.2–5% by weight of aluminum salts which have as their anion, the anion of a mineral acid.

Typical aluminum salts used to prepare the treating solutions are such materials as aluminum sulfate, aluminum nitrate, aluminum chloride, aluminum phosphate, aluminum citrate, tartarate and glycolate and formate, aluminum bromide, and other aluminum halides, e.g., the fluorides and iodides. Aluminum sulfates e.g., $$Al_2(SO_4)_3 \cdot 18H_2O$$

are prefered due to their low cost and availability. For substantial benefits to be achieved by the contact of the contaminated silica-alumina cracking catalyst with the acidic aluminum salt solutions, it is desirable that the make-up water used to prepare the solutions be relatively free of other ionic constituents, and to this end it is desirable to use demineralized or distilled water for preparing the solutions. To expedite metal removal, it is also desirable that the temperature of the solution used to treat the catalyst be at least 150° F., with a preferred temperature range being at least 180° F. to about the boiling point of such solutions.

The contact time between the solution and the metal-fouled silica-alumina catalyst will vary, depending upon the concentration of the solution, its temperature, and the volume of solution in relationship to the catalyst. As a general rule, however, contact times as little as one-half hour as to as much as five hours give adequate results.

The volume of treating solution in relation to catalyst may be varied, although in a preferred practice of the invention, the ratio of solution to catalyst should be at least 1:1, and is preferably 2:1, with larger amounts of solution being usually effective but not necessary, since it requires the handling of large volumes of liquids. As a general rule, it may be stated that the amount of solution be sufficient to provide a workable, transportable slurry.

For optimum metal removal, it is desirable that the metal-contaminated catalyst be subjected to a conventional regeneration in which undesirable coke or carbon deposits are removed from the catalyst by high temperature treatment. This regeneration or coke removal step is well-known in the catalyst art, and may be performed in any of the well-known ways now utilized by petroleum refineries.

In some instances, particularly where dilute solutions, e.g., 0.2–1% by weight of acidic aluminum salts are employed, it is desirable that pH corrections be made to provide suitable acidity for the process. Generally, the aluminum salt, when used at the concentrations specified, will be sufficiently acidic, although, as indicated, when dilute solutions are utilized, it is necessary to add additional acid to provide a pH within the range of between 2.0–5.5. For purposes of pH adjustment, it is desirable to use a mineral acid which has an anion corresponding to the anion of the acidic aluminum salt.

While acidic aluminum salts are the preferred treating agents of the invention it is contemplated other acidic salts may also be used. Such salts as ammonium chloride, ferric sulfate, sodium dihydrogen phosphate, ammonium nitrate and the like are also useful in the practice of the invention. As in the case of the aluminum salts, they are used as dilute solutions and the pH is adjusted within the ranges specified.

To illustrate the metal removal ability of the invention, the following is presented by way of example:

*Example I*

Catalyst: A clay modified silica-alumina catalyst. See Example 1, U.S. Patent 3,034,994. Aluminum salt solution concentration as indicated.
Apparatus: 500 ml. round flask, Teflon stirrer.
Temperature: 180° F.
Time: As reported below.

pH: No pH adjustments made; pH values shown are those of solutions as prepared.

TABLE I.—PERCENT METALS REMAINING AFTER TREATMENT

| Treatment and Time | Fe | Ni | V |
|---|---|---|---|
| (1) Untreated (control) | 0.364 | 0.0141 | 0.112 |
| (2) 0.5% $Al_2(SO_4)_3 \cdot 18H_2O$ initial pH of solution 3.65, 1½ hours | 0.302 | 0.0126 | 0.102 |
| (3) 1% $Al_2(SO_4)_3 \cdot 18H_2O$ (pH 3.5) 1½ hours | 0.288 | 0.0118 | 0.103 |
| (4) 2% $Al_2(SO_4)_3 \cdot 18H_2O$ (pH 3.15) 1½ hours | 0.280 | 0.0118 | 0.100 |
| (5) 0.5% $Al(Cl_3) \cdot 6H_2O$, pH 3.45, 1½ hours | 0.315 | 0.0126 | 0.112 |

Maximum metal removal is noted at 2% aluminum sulfate concentration, while acceptable removal is also obtained with 1% and 0.5% solutions.

*Example II*

The following data were obtained with 1%

$$Al_2(SO_4)_3 \cdot 18H_2O$$

solutions. The catalyst contained 23% $Al_2O_3$ and was a modified clay type. Carbon was completely burned off, and magnetic iron removed, at 180° F. Residual $SO_4^=$ was removed with $NH_4OH$ at pH 10.0 after treatment with Al-salt.

TABLE II.—PERCENT METALS BEFORE AND AFTER TREATMENT

| Treatment | Na (Na₂O) | Al (Al) | Si (SiO₂) | V (V) | Fe (Fe) | Ni (Ni) |
|---|---|---|---|---|---|---|
| (1) Untreated | 0.07 | 21.7 | 56.3 | 0.218 | 0.418 | 0.028 |
| (2) 1% Al-salt alone, no pH adjustment | | | | 0.195 | 0.402 | 0.024 |
| (3) pH held constant at 3.5 by addition of HCl | 0.02 | 20.4 | 57.6 | 0.186 | 0.397 | 0.026 |
| (4) pH held constant at 3.5 by addition of $H_2SO_4$ | 0.01 | 20.4 | 57.4 | 0.186 | 0.397 | 0.026 |

TABLE III.—UOP-TEST COMPARISONS[1]

| | Vol. Act. | ABD[2] | Wt. Act. | CWF[3] | GWF[4] | GVF[5] | Percent C | Gas Sp. Gr. |
|---|---|---|---|---|---|---|---|---|
| (1) Above | 46 | 0.66 | 35 | 2.79 | 0.90 | 1.22 | 7.35 | 0.86 |
| (2) Above | 53 | 0.62 | 43 | 1.14 | 1.50 | 1.39 | 3.78 | 1.13 |
| (3) Above | 52 | 0.58 | 49 | 1.02 | 0.73 | 1.13 | 3.35 | 1.02 |
| (4) Above | 54 | 0.59 | 50 | 0.84 | 0.85 | 1.22 | 3.09 | 1.02 |

[1] See Methods for the Analysis & Testing of Catalysts, Nalco Chemical Company.
[2] Apparent Bulk Density.
[3] Carbon weight factor.
[4] Gas weight factor.
[5] Gas volume factor.

The above examples show the metal removal efficiency of dilute aluminum salt solutions for the treatment of silica-alumina catalysts.

As noted from the examples, in some instances the pH of the treating solution tends to increase due to an apparent leaching of metals from the catalysts. To achieve maximum results it is important that the pH be maintained within the range specified. To achieve this result the invention contemplates the maintenance of the starting pH by the addition of acid or acidic salt.

The importance of the invention not only resides in the ability of the process presented to effectively remove contaminants from silica-alumina cracking catalysts, but more important is the fact that the treating conditions are sufficiently mild, whereby alumina is not removed from the catalyst. While it has been proposed to acid treat catalysts with very concentrated solutions of alumina, whereby the alumina content of the catalyst is increased in an effort to increase activity of spent catalyst, nevertheless, such systems or processes are so drastic that they are not entirely satisfactory. The invention not only removed undesirable components, but at the same time, does not disturb the basic catalyst structure or its physical make-up. Important advantages of the invention are that the treating solutions are readily prepared, are dilute, easily handled, and they provide a one-step treating process for restoring the activity of metal contaminated catalysts.

Having thus described my invention, it is claimed as follows:

1. A method of removing metal contaminants from silica-alumina cracking catalysts, which comprises contacting said catalysts for at least ½ hour with a dilute aqueous solution which contains from 0.1 to 5% by weight of a water-soluble acidic aluminum salt, with the temperature of said solution being at least 150° F. and the pH being between 2 and 5.5.

2. The method of claim 1, where the acidic aluminum salt is an aluminum sulfate.

3. The process of claim 1 where the pH of the treating solution is maintained between 2 and 5.5.

References Cited

UNITED STATES PATENTS

| | | | |
|---|---|---|---|
| 2,618,613 | 11/1952 | Kimberlin et al. | 252—412 |
| 3,148,155 | 9/1964 | Schwartz | 252—413 |
| 3,220,956 | 11/1965 | Cramer et al. | 252—413 |
| 3,234,145 | 2/1966 | Foster | 252—413 |

DANIEL E. WYMAN, *Primary Examiner.*

OSCAR R. VERTIZ, *Examiner.*

A. J. GREIF, L. G. XIARHOS, *Assistant Examiners.*